2,937,101
HEAT RESISTANT COMPOSITION

Russell Aiken Nelson, Norristown, and Stanley Zirinsky, Elkins Park, Pa., assignors to General Electric Company, a corporation of New York No Drawing. Application June 6, 1957
Serial No. 663,878

8 Claims. (Cl. 106—55)

This invention generally relates to a composition of matter possessing improved thermal, structural, and chemical inertness and finding particular utility for use as an outer fabric body structure in high speed aircraft and the like.

As an aircraft body exceeds supersonic speed through the atmosphere and approaches and assumes hypersonic speed, it experiences what has been termed the "heat barrier" which is a complex atmospheric condition producing temperatures in the range of 10,000° F. and heating rates in the range of 3 B.t.u. per second over each square foot of its surface. Such extreme heat conditions are more than sufficient to melt and/or vaporize most known materials at an extremely rapid rate quite similar to the burning and destruction of meteors entering the atmosphere from outer space. To survive this heat barrier and to prevent excessive heating of the internal parts thereof for effective performance, such a craft must absorb or dissipate this heat while maintaining structural strength and aerodynamic shape. Similarly in many other applications there exists a critical need for materials that retain strength under similarly extremely hot and erosive environments.

One known group of materials exhibiting certain desired chemical and thermal inertness characteristics under such extreme conditions is the class of dense ceramics, which are materials possessing high specific heat, high melting point, high heat of fusion and vaporization and relatively good chemical inertness. However, although possessing such desirable features, dense ceramics are generally inadequate for aircraft or similar applications due to their susceptibility to cracking and fracture with extreme thermal stress and non-uniform heating.

To overcome these disadvantages in accordance with the present invention, there is provided a new composition of matter which may be termed a "semi-ceramic" having the heat and corrosion resistance of the dense ceramics and, in addition, possessing the improved characteristic of being thermally shock resistant.

It is accordingly one object of the present invention to provide a substantially chemically inert heat resistant composition possessing relatively great thermal shock resistance.

Another object of this invention is to provide such a material that can be readily fabricated into desired shapes and thicknesses.

Still another object of the present invention is to provide such a material that may be fabricated at relatively low temperatures and pressures.

Other objects and many attendant advantages will be more readily comprehended to those skilled in the art upon a detailed consideration of the following specification.

Briefly in accordance with the present invention there is chemically reacted particles of fused magnesium oxide with phosphoric acid in given proportions and at certain low temperatures and pressures thereby producing a new composition having quite unexpected characteristics. This new composition may be continuously subjected to temperatures of at least 2650° F. in an oxygen containing atmosphere without harmful deterioration. Additionally, it possesses the high-heat of vaporization and high-heat of fusion approximating that obtainable from the dense ceramic, magnesium oxide, alone together with property of being relatively inert and unaffected by oxidation or corrosion. However, unlike magnesium oxide, this composition is surprisingly nonbrittle and flexible and hence possesses great thermal shock resistance as well as being moisture resistant or relatively non-absortive. This latter feature is to be contrasted with the undesirability of many materials which absorb water, and later upon rapid exposure to great heating, explode as the entrapped water expands and vaporizes.

All of these characteristics render this material particularly well suited for high-speed aircraft body structures adapted to withstand the "heat barrier," since this composition embodies substantially all of the desirable characteristics of the ceramic materials while eliminating the undesirable brittleness of these ceramics which for applications of this nature have rendered these materials so undependable and undesirable.

To obtain this improved composition, particles of fused magnesium oxide are mixed with phosphoric acid in such proportions as to form a mixture having a wet sand-like consistency; and the sand-like mixture is then molded, rolled, or otherwise shaped into desired forms and thicknesses under medium pressures of about 3,000 to 5,000 pounds per square inch and at temperatures of about 250° F. to 400° F. for intervals ranging from about thirty seconds to eight minutes. This results in a chemical interaction between these materials forming a bonded solid product and releasing water vapor as a by-product.

In the following step the resulting product is gradually cooled under these same pressures until the temperature of the solid reaches a value less than the boiling temperature of water, preferably a temperature in the range of 160° F. to 210° F., so that the by-product water vapor is condensed and entrapped within the product. This step is particularly important to assure a well-bonded solid, since if the water vapor is not condensed before removing the pressure, it has been found that the bond is poor and the material delaminates.

In the final step, the pressure is removed and the material is preferably baked at temperatures of about 600° F. or greater for a sufficient time period to allow the entrapped water to vaporize and escape through the pores of the material in a gradual manner. Baking intervals of about twelve hours have been made to insure the removal of most of the water, but reasonable variations in the baking time interval and in the temperature may, of course, be made without substantial differences in the resulting product.

Variations in the molding or forming pressure and in the forming temperature beyond those given above may also be made but it has been found that an increase in pressure above 5,000 pounds produces but a rather small increase in the density of the resulting bonded product. Similarly, although an increase in the molding temperature above 400° F. also shortens the chemical reaction time, it does so to a limited extent. Consequently in view of the minor variations in the speed of reaction and density, with increased temperature and pressure, it is preferred to operate in the above ranges. Additionally, the maximum temperature, is, of course, limited by the vaporization of the acid or the fusion of the magnesium oxide particles and it appears undesirable to exceed temperatures of 1,000° during the forming step.

As is well known, magnesium oxide in unfused form readily reacts, or dissolves in phosphoric acid and accordingly is undesirable for forming the bonded material of the present invention. However, fused magnesium oxide is relatively insoluble in the acid and but negligible amounts of this fused material dissolve in the acid during intervals of perhaps twenty minutes after the mixture. Hence this limited solubility does not appreciably affect the formation of the bonded product if the above mixing and bonding steps are performed with reasonable expediency.

Fused magnesium oxide particles are normally obtainable on the open commercial market in powdered form of from 40 to 300 mesh size, and this range of powdered material has been found satisfactory.

The relative proportions of the fused particles and the acid that have been found most desirable are from 50 to 90 parts by weight of the powdered magnesium oxide to from 5 to 62 parts by weight of the phosphoric acid.

The percentage concentration of phosphoric acid given as proportions of phosphoric anhydride to water may range from 43% of phosphoric anhydride to 57% water up to substantially all phosphoric anhydride with very little water. Small amounts of water are always present due to handling of the phosphoric anhydride during processing.

It has been found that the heat insulating properties of this bonded material may be enhanced by the addition of asbestos fibers to the initial mixture when in the sand-like consistency. These fibers may be mixed either homogeneously or non-homogeneously to the mixture to provide a resulting composition having improved thermal-insulating properties. Asbestos fibers of about 5/8 of an inch to 1/32 of an inch may be added in the range by weight of about 5 parts to 60 parts. These fibers also bond with the phosphoric acid, providing a product having somewhat the same strength and mechanical properties of the composition without the fibers but with improved thermal-insulating properties.

If it is desired to strengthen the resulting product, glass fibers may be added instead of, or in addition to the asbestos material to provide reinforcement. These fibers may also be added homogeneously throughout the mixture or non-homogeneously as desired. For example, either randomly distributed glass fibers or a woven glass mat may be added to either the surface or body of the mixture while in the sand-like consistency, as desired, and preferably added in the range of 5 parts to 60 parts by weight. In the event that both glass fibers and asbestos fibers are added for improving both the heat-insulating properties and strength, it is preferred that these fibers be added in the total amount ranging from 5 to 60 parts by weight.

It has also been found that the melting point of the product may be raised by the addition of powdered graphite and/or the refractory nitrides, or refractory carbides including boron nitride, titanium nitride, tungsten carbide and the like. As is well known graphite does not melt but rather sublimes at temperatures as high as 6,600° F., and the refractory nitrides likewise melt or sublime at much higher temperatures than the magnesium oxide. These materials are also preferably added in the range by weight of 5 to 60 parts. To enable a well bonded composition to be obtained the powdered materials selected must also be relatively insoluble in the acid at temperatures in the range of 300 to 400° F. to prevent dissolution in the acid, as discussed above.

To add further versatility to this composition, as for example, to make the composition more electrically conductive, metal powder, such as stainless steel, copper, or silver may also be added to the mixture as desired in the range by weight of preferably 5 to 60 parts. The addition of these metals not only increases the electrical conductivity of the composition but also the thermal-conductivity and, in addition, increases the density of the resulting composition which may be desired for certain applications. By this technique electrical printed circuits can be fabricated by adding metal powders in predetermined patterns as layers across the upper surface of this composition which has molded or formed as a plate. However, any of these metals or other materials should be relatively non-soluble in the acid solution at least for periods of about 5 to 30 minutes at the temperatures involved for the reasons discussed above, and these materials should also have linear coefficients of expansion that are less than that of the bonded composition to insure that the resulting reinforced or semi-conductive material does not fracture upon the application of heat. A suitable wire or wire-mesh material may also be added, if desired, for the purpose of reinforcing the composition and providing greater mechanical strength, and such wire should also have a lower linear coefficient of expansion than the product. One suitable material meeting these conditions is SAE type 410 stainless steel.

Still another manner of enhancing the versatility of this composition may be obtained by adding a powdered or fibrous material having a high-heat of vaporization but a much lower melting point or vaporizing temperature than the fused magnesium oxide. The addition of such material increases the heat absorptive ability of the composition since the high-heat of vaporization additive upon ablating cools the product. For this purpose powdered or fibrous material composed of tetrafluoroethylene, polymethyl methacrylate, polyamides, and polyethylene, or the like may be added, or inorganic materials having similar characteristics such as ammonium salts, boric acid, or any of the various salts containing water of crystallization. All of these latter materials are preferably added in the range by weight of 5 to 60 parts in a manner similar to the above additives in a manner so as not to unduly weaken the magnesium oxide-phosphoric acid bond.

Although but preferred materials and ranges of composition have been described together with a preferred method of fabrication in accordance with the requirements of the patent laws, it is believed evident to those skilled in the art that many variations and substitutions may be made without departing from the spirit and scope of this invention. Additionally, although but one preferred aircraft application has been mentioned as an example of the utility of this material, it is believed evident that the improved characteristics of this composition make it extremely desirable for many other relatively unrelated applications. Accordingly, this invention is to be considered as being limited only in accordance with the following claims appended hereto.

What is claimed is:

1. A high heat resistant bonded material, possessing mechanical and thermal-shock resistance, consisting essentially of fused magnesium oxide particles and phosphoric acid, with the magnesium oxide particles being from 50 to 90 parts by weight, and the acid being from 2.15 to 62 parts by weight.

2. In the material of claim 1, the inclusion of a high melting point powdered material of the class consisting of graphite, boron nitride, titanium nitride, and tungsten carbide in the range by weight of from 5 to 60 parts.

3. In the material of claim 1, the composition additionally including a powdered electrically conductive material of the class consisting of stainless steel, copper, and silver in the range of from 5 to 60 parts by weight.

4. A method of forming a high heat resistant composition comprising the steps of mixing fused magnesium oxide and phosphoric acid, bonding the composition at pressures of approximately 3,000 to 5,000 pounds per square inch while maintaining the composition at temperatures of about 250 degrees F. to 400 degrees F. for an interval of from 30 seconds to 8 minutes, cooling the composition to a temperature in the range of from 160 degrees F. to 210 degrees F. while the composition is maintained under pressure of approximately from 3,000 to 5,000 pounds per square inch, and then heating the composition to a temperature of about 600 degrees F. with the pressure removed for a period up to 12 hours.

5. In the material of claim 1, the inclusion of 5 to 60 parts by weight of a material of the class consisting of fibers of tetrafluoroethylene, polymethyl methacrylate, polyamides, or polyethylene.

6. In the material of claim 1, the composition additionally including asbestos fibers in the range of from 5 to 60 parts by weight.

7. In the material of claim 1, the composition additionally including glass fibers in the range of from 5 to 60 parts by weight.

8. In the material of claim 1, the composition additionally including asbestos fibers and glass fibers in the total amount of from 5 to 60 parts by weight.

References Cited in the file of this patent

UNITED STATES PATENTS

| | | |
|---|---|---|
| 1,435,416 | Ottman | Nov. 14, 1922 |
| 2,363,329 | Horsfield | Nov. 21, 1944 |
| 2,683,667 | Utter | July 13, 1954 |

OTHER REFERENCES

The Condensed Chemical Dictionary, 4th Edition (1950).